United States Patent
Burckart et al.

(10) Patent No.: US 9,882,954 B2
(45) Date of Patent: *Jan. 30, 2018

(54) SELECTIVE PARTIAL UPDATES OF WEB CONTENT

(75) Inventors: Erik J. Burckart, Raleigh, NC (US); Andrew Ivory, Wake Forest, NC (US); Todd E. Kaplinger, Raleigh, NC (US); Aaron K. Shook, Raleigh, NC (US)

(73) Assignee: SNAP INC., Venice, CA (US)

( * ) Notice: Subject to any disclaimer, the term of this patent is extended or adjusted under 35 U.S.C. 154(b) by 610 days.

This patent is subject to a terminal disclaimer.

(21) Appl. No.: 13/546,498

(22) Filed: Jul. 11, 2012

(65) Prior Publication Data

US 2012/0284611 A1    Nov. 8, 2012

Related U.S. Application Data

(63) Continuation of application No. 12/414,806, filed on Mar. 31, 2009, now Pat. No. 8,275,859.

(51) Int. Cl.
*G06F 17/00* (2006.01)
*H04L 29/08* (2006.01)

(52) U.S. Cl.
CPC .......... *H04L 67/02* (2013.01); *H04L 67/2852* (2013.01); *H04L 67/2876* (2013.01); *H04L 67/2885* (2013.01)

(58) Field of Classification Search
CPC .......... G06F 17/2235; G06F 17/30893; H04L 67/2885; H04L 67/2895; H04L 67/02; H04L 67/2876
USPC .............................. 715/205; 726/12; 709/219
See application file for complete search history.

(56) References Cited

U.S. PATENT DOCUMENTS

| | | | | |
|---|---|---|---|---|
| 6,073,175 A * | 6/2000 | Tavs | ........................ | H04L 29/06 709/226 |
| 6,185,625 B1 * | 2/2001 | Tso | .................... | G06F 17/30905 707/E17.121 |
| 6,360,273 B1 * | 3/2002 | Beurket | ............ | G06F 17/30902 707/E17.12 |
| 6,772,214 B1 * | 8/2004 | McClain et al. | ............... | 709/229 |
| 6,839,761 B2 * | 1/2005 | Kadyk | ................ | H04L 63/0281 709/203 |
| 6,879,998 B1 * | 4/2005 | Raciborski | ........ | G06F 17/30864 707/E17.108 |
| 7,051,084 B1 * | 5/2006 | Hayton | ................ | G06F 17/3089 707/E17.116 |
| 7,346,842 B1 * | 3/2008 | Hayton et al. | ................ | 715/234 |
| 7,383,348 B2 * | 6/2008 | Seki | ........................ | H04L 29/06 709/219 |

(Continued)

OTHER PUBLICATIONS

Challenger et al., A Fragment-based Approach for Efficiently Creating Dynamic Web Content, ACM 2005, pp. 359-389.*

(Continued)

*Primary Examiner* — Cong-Lac Huynh
(74) *Attorney, Agent, or Firm* — Schwegman Lundberg & Woessner, P.A.

(57) ABSTRACT

A request for a partial update of web content is received that identifies at least one web content element associated with the web content. An update is requested for the identified at least one web content element from a content server. The partial update of the web content is performed in response to receipt of the update for the identified at least one web content element from the content server.

21 Claims, 7 Drawing Sheets

(56) References Cited

U.S. PATENT DOCUMENTS

| | | | | |
|---|---|---|---|---|
| 7,454,463 | B2* | 11/2008 | Raguseo | H04L 67/06 709/203 |
| 7,523,158 | B1* | 4/2009 | Nickerson et al. | 709/203 |
| 7,600,185 | B2* | 10/2009 | Asakawa | G06F 17/30905 715/246 |
| 7,743,160 | B2* | 6/2010 | Li | H04L 12/66 370/338 |
| 7,805,670 | B2* | 9/2010 | Lipton | G06F 17/30899 709/203 |
| 7,930,479 | B2* | 4/2011 | Barda | G06F 17/30902 711/118 |
| 7,974,934 | B2* | 7/2011 | Ravikumar | G06F 17/30905 706/12 |
| 8,073,865 | B2* | 12/2011 | Davis | G06F 17/2745 707/707 |
| 8,181,107 | B2* | 5/2012 | Melnyk | G06F 17/30905 715/238 |
| 8,537,835 | B2* | 9/2013 | Saniee | H04N 7/17336 370/395.72 |
| 8,671,205 | B2* | 3/2014 | Demmer | H04W 4/02 709/220 |
| 8,762,569 | B1* | 6/2014 | Ly | H04L 69/16 709/238 |
| 9,037,671 | B2* | 5/2015 | Weber | G06F 3/0607 709/212 |
| 9,055,108 | B2* | 6/2015 | Tychina | H04L 69/16 |
| 2002/0010757 | A1* | 1/2002 | Granik et al. | 709/218 |
| 2002/0091753 | A1* | 7/2002 | Reddy et al. | 709/202 |
| 2004/0128618 | A1* | 7/2004 | Datta | G06F 17/30902 715/234 |
| 2005/0204047 | A1* | 9/2005 | Mitchell et al. | 709/228 |
| 2006/0031899 | A1* | 2/2006 | Rabin | G06Q 20/12 725/104 |
| 2007/0143672 | A1* | 6/2007 | Lipton | G06F 17/30899 715/205 |
| 2008/0307301 | A1 | 12/2008 | Decker et al. | |
| 2008/0320225 | A1 | 12/2008 | Panzer et al. | |
| 2009/0037517 | A1* | 2/2009 | Frei | G06F 17/30893 709/202 |
| 2009/0199250 | A1* | 8/2009 | Assouline | H04N 7/173 725/96 |
| 2009/0204602 | A1* | 8/2009 | Sarlos | G06F 17/30882 |
| 2009/0316715 | A1* | 12/2009 | Saniee | H04N 7/17336 370/429 |
| 2010/0017464 | A1* | 1/2010 | Cheng | G06F 17/30905 709/203 |
| 2010/0017502 | A1* | 1/2010 | Cheng | G06F 17/30905 709/219 |
| 2010/0250706 | A1* | 9/2010 | Burckart et al. | 709/219 |
| 2010/0268789 | A1* | 10/2010 | Yoo | H04L 67/2842 709/214 |
| 2011/0231782 | A1* | 9/2011 | Rohrabaugh | G06F 9/4443 715/760 |
| 2012/0166548 | A1* | 6/2012 | Gropper | 709/205 |
| 2012/0290795 | A1* | 11/2012 | Dowlatkhah | G06F 17/30566 711/136 |
| 2012/0303697 | A1* | 11/2012 | Alstad | G06F 17/3089 709/203 |
| 2013/0041974 | A1* | 2/2013 | Luna | A61B 3/10 709/213 |
| 2013/0212462 | A1* | 8/2013 | Athas et al. | 715/234 |
| 2013/0246508 | A1* | 9/2013 | McCanne | H03M 7/30 709/203 |
| 2014/0278996 | A1* | 9/2014 | Curry | H04L 67/22 705/14.55 |
| 2015/0088970 | A1* | 3/2015 | Wei | H04L 67/10 709/203 |
| 2015/0286711 | A1* | 10/2015 | Chin | G06F 17/30867 706/12 |

OTHER PUBLICATIONS

Sabucedo et al., Reusing Web Contents: A DOM Approach, John Wiley & Sons 2008, pp. 299-314.*
Mahanti et al., Traffic Analysis of a Web Proxy Caching Hierarcht, IEEE 2000, pp. 16-23.*
Bartolini et al., A Walk through Content Delivery Networks, Springer 2004, pp. 1-25.*
Bharadvaj et al. An Active Transcoding Proxy to Support Mobile Web Access, IEEE 1998, pp. 1-6.*
Cohen et al., Improving End-to-End Performance of the Web Using Server Volumes and Proxy Filters, ACM 1998, pp. 241-253.*
Rodriguez et al., Dynamic Parallel Access to Replicated Content in the Internet, IEEE 2002, pp. 455-465.*
Wessels et al., ICP and the Squid Web Cache, IEEE 1998, pp. 345-357.*
Fan et al., Summary Cache: A Scalable Wide-Area Web Cache Sharing Protocol, ACM 1998, pp. 254-265.*
Xu et al., Caching and Prefetching for Web Content Distribution, IEEE 2001, pp. 54-59.*
Gupta et al., Extracting Context to Improve Accuracy for HTML Content Extraction, ACM 2005, pp. 1114-1115.*
Vakali et al., Content Delivery Networks: Status and Trends, IEEE 2003, pp. 68-74.*
United States Patent and Trademark Office, Office Action for U.S. Appl. No. 12/414,806, dated Nov. 10, 2010, pp. 1-23, Alexandria, VA, USA.
United States Patent and Trademark Office, Office Action for U.S. Appl. No. 12/414,806, dated Apr. 8, 2011, pp. 1-23, Alexandria, VA, USA.
United States Patent and Trademark Office, Office Action for U.S. Appl. No. 12/414,806, dated Oct. 13, 2011, pp. 1-21, Alexandria, VA, USA.
United States Patent and Trademark Office, Office Action for U.S. Appl. No. 12/414,806, dated Feb. 2, 2012, pp. 1-24, Alexandria, VA, USA.
United States Patent and Trademark Office, Notice of Allowance for U.S. Appl. No. 12/414,806, dated May 18, 2012, pp. 1-8, Alexandria, VA, USA.
Author Unknown, Clipmarks: Learn More, Website/page, Printed from website on Mar. 31, 2009, p. 1, Clipmarks, LLC, published at: www.clipmarks.com/learn-more.
"U.S. Appl. No. 12/414,806, Response filed Jan. 10, 2012 to Final Office Action dated Oct. 13, 2011", 25 pgs.
"U.S. Appl. No. 12/414,806, Response filed Jan. 31, 2011 to Non Final Office Action dated Nov. 10, 2010", 27 pgs.
"U.S. Appl. No. 12/414,806, Response filed Apr. 10, 2012 to Non Final Office Action dated Feb. 2, 2012", 21 pgs.
"U.S. Appl. No. 12/414,806, Response filed Jul. 6, 2011 to Non Final Office Action dated Apr. 8, 2011", 30 pgs.

* cited by examiner

SELECTIVE PARTIAL UPDATES OF WEB CONTENT

RELATED APPLICATIONS

This application is a continuation of, claims priority to, and claims the benefit of U.S. patent application Ser. No. 12/414,806 titled "SELECTIVE PARTIAL UPDATES OF WEB CONTENT," which was filed in the United States Patent and Trademark Office on Mar. 31, 2009, which has a current status of "Allowed," and which is incorporated herein by reference in its entirety.

BACKGROUND

The present invention relates to systems and methods for updating elements associated with web content. More particularly, the present invention relates to selective partial updates of web content.

Web pages include a variety of elements. Some of the elements represent content that is static with respect to a web page, such as titles, logos, and other content that does not change over time. Other elements may change over time. For example, stock quotes and sports scores may change over time and may change during a period of interest for a viewer of a given web page. Periodically, an application server responsible for the content generates a new web page with all changed content and forwards the changed content along with the static content for updating within the viewer's browser. The update period is selected by the application server based upon configuration options for the server. The viewer may request a refresh of the entire web page by manually selecting a series of menu options within the browser. The browser will then initiate a download of the entire web page and re-present the entire web page to the viewer.

BRIEF SUMMARY

The subject matter described herein provides automated selective partial updates of web content. A user of a web browser associated with a consumer electronics device is provided with an ability, via the consumer electronics device, to select individual content elements associated with web content for updating. The user is also provided with the ability to select an update interval for the selected partial updates of web content. At a consumer electronics device, a forward proxy server, a reverse proxy server, or an application server, a request for a selective partial update of web content is received. In response to receipt of the request for the selective partial update of web content, the receiving device processes the request to determine whether the request may be served locally. Upon determining that the content is not available locally, the receiving device requests the selected portion of the content from an upstream entity that may be able to serve the partial content. In response to receipt of the content, the selected portion of content is updated.

A method includes receiving a request for a partial update of web content that identifies at least one web content element associated with the web content; requesting an update for the identified at least one web content element from a content server; and performing the partial update of the web content in response to receipt of the update for the identified at least one web content element from the content server.

A system includes a processor programmed to: receive a request for a partial update of web content that identifies at least one web content element associated with the web content; request an update for the identified at least one web content element from a content server; and perform the partial update of the web content in response to receipt of the update for the identified at least one web content element from the content server.

An alternative system includes a cache memory; a display; and a processor programmed to: receive a request for a partial update of web content that identifies at least one web content element associated with the web content; request an update for the identified at least one web content element from a content server, where the request further comprises: a markup language (ML) formatted request identifying a portion of a document object model (DOM) associated with the identified at least one web content element to the content server comprising at least one of a path identifier that references a path to the at least one web content element within the DOM and a content identifier that identifies the at least one web content element within the DOM; and a request for a periodic update for the identified at least one web content element identifying a user-specified period for the periodic update; and perform the partial update of the web content in response to receipt of the update for the identified at least one web content element from the content server, where the processor is further programmed to at least one of: store the update for the identified at least one web content element to the cache memory associated with the web content; send the update for the identified at least one web content element to a device from which the request for the partial update of the web content was received; and update a display region of the display associated with the identified at least one web content element with the update for the identified at least one web content element.

A computer program product includes a computer useable storage medium including a computer readable program. The computer readable program when executed on a computer causes the computer to receive a request for a partial update of web content that identifies at least one web content element associated with the web content; request an update for the identified at least one web content element from a content server; and perform the partial update of the web content in response to receipt of the update for the identified at least one web content element from the content server.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated selective partial updates of web content. A user of a web browser associated with a consumer electronics device is provided with an ability, via the consumer electronics device, to select individual content elements associated with web content for updating. The user is also provided with the ability to select an update interval for the selected partial updates of web content. At a consumer electronics device, a forward proxy server, a reverse proxy server, or an application server, a request for a selective partial update of web content is received. In response to receipt of the request for the selective partial update of web content, the receiving device processes the request to determine whether the request may be served locally. Upon determining that the content is not available locally, the receiving device requests the selected portion of the content from an upstream entity that may be able to serve the partial content. In response to receipt of the content, the selected portion of content is updated.

The selective partial updates of web content described herein may be performed in real time to allow prompt updating of selected portions of web content associated with a web page. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a portion of a second or within a few seconds). These terms, while difficult to precisely define are well understood by those skilled in the art.

Figure 1:
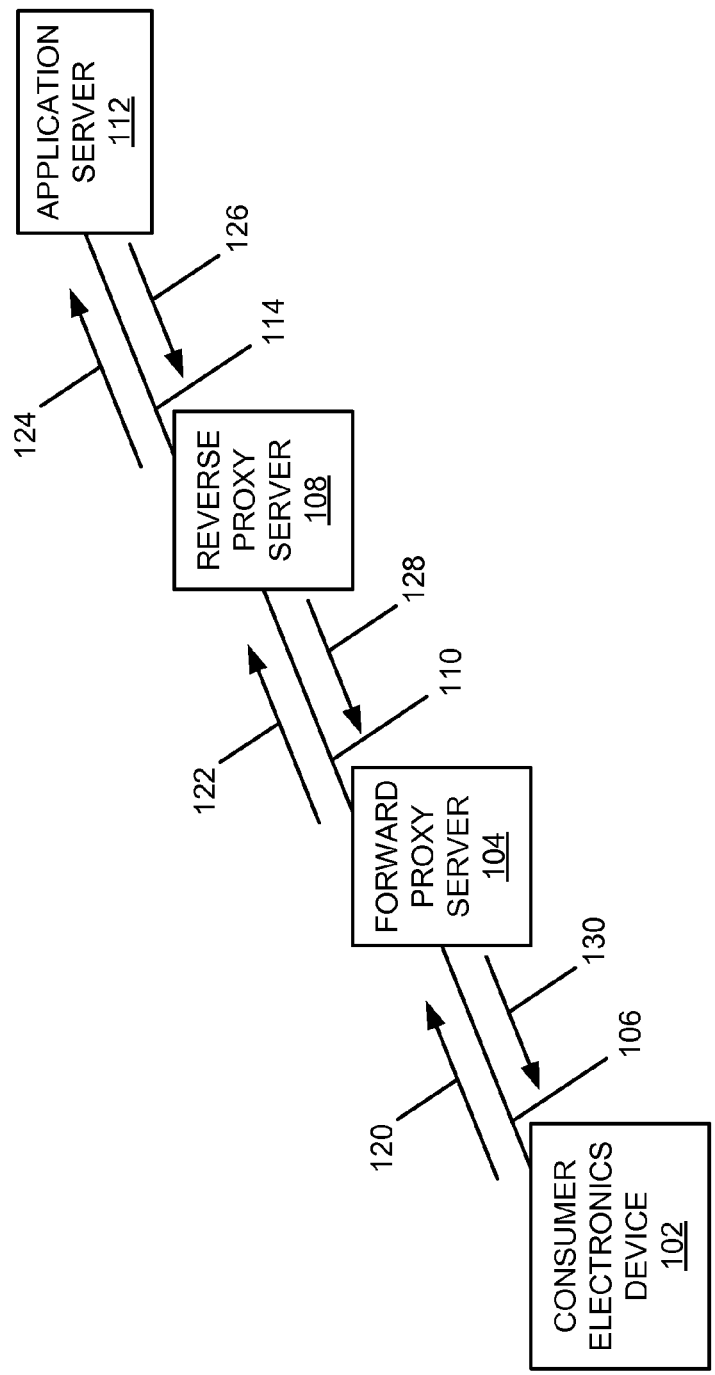
FIG. 1 is a block diagram of an example of an implementation of a system for automated selective partial updates of web content based upon requested portions of the web content to be updated and a requested update period according to an embodiment of the present subject matter.

FIG. 1 is a block diagram of an example of an implementation of a system 100 for automated selective partial updates of web content based upon requested portions of the web content to be updated and a requested update period. Within the system 100, a consumer electronics device 102 is shown interconnected with a forward proxy server 104 via an interconnection 106. The forward proxy server 104 is shown interconnected with a reverse proxy server 108 via an interconnection 110. The reverse proxy server 108 is shown interconnected with an application server 112 via an interconnection 114.

For purposes of the present description, the interconnection 106, the interconnection 110, and the interconnection 114 may be any form of interconnection suitable for the intended purpose, including a private or public network such as an intranet or the Internet, respectively, direct inter-module interconnection, dial-up, or any other interconnection mechanism capable of interconnecting the devices. Furthermore, the interconnection 106, the interconnection 110, and the interconnection 114 may include firewalls or other partitioning or share a network, such as a private intranet without departure from the scope of the present subject matter.

As will be described in more detail below, each device along a path of a request for a selective partial update of web content may perform a variety of processing operations. As such, a request for a selective partial update of web content may be processed at any of the consumer electronics device 102, the forward proxy server 104, the reverse proxy server 108, and the application server 112. Furthermore, it should be understood that a request for a selective partial update of web content may also be received at the consumer electronics device 102 from a user via interaction with an input device (not shown in FIG. 1) associated with the consumer electronics device 102. In such a situation, the consumer electronics device 102 also performs processing associated with the requested selective partial update of web content.

Accordingly, each device along the path of a request for a selective partial update of web content performs activities associated with automated selective partial updates of web content. By providing capabilities for automated selective partial updates of web content at each device, bandwidth may be preserved when a response may be formed by the respective device rather than forwarding the request for additional processing via a different device. Additionally, when a request is fulfilled by the application server 112, either with or without forwarding the request to an associated web content application that resides in association with the application server 112, automated selective partial updates of web content may be implemented for a given system without modification to the associated application.

Additionally, for purposes of the present description, any device from which updates of web content may be requested and provided is considered a content server for the respective device. For example, the forward proxy server 104 may be a content server for devices, such as the consumer electronics device 102, by responding to requests for updates of web content to the consumer electronics device 102 Likewise, a web content application associated with the application server 112 may be a content server for the application server 112 by responding to requests for updates of web content.

An example communication flow for requests and responses for partial updates of web content between the components shown within FIG. 1 is depicted by a series of arrows. As such, an arrow 120 represents an outbound communication from the consumer electronics device 102 to the forward proxy server 104. As will be described in more detail below, the communication represented by the arrow 120 and originating from the consumer electronics device 102 may be a request for a selective partial update of web content.

While the arrow 120 represents an initial request for a selective partial update of web content originating from the consumer electronics device 102, upon receipt, the forward proxy server 104 may determine whether it is capable of providing a response to the initial request or whether it needs to forward the response for fulfillment. When a determination is made to forward the request for the selective partial update of web content, the forward proxy server 104 forwards the request to the reverse proxy server 108 as represented by the arrow 122.

Upon receipt of the forwarded request, the reverse proxy server 108 makes a determination as to whether it is capable of providing a response to the initial request or whether it needs to forward the response for fulfillment. Upon determining to forward the request for fulfillment, the reverse proxy server 108 forwards the request to the application server 112 as represented by the arrow 124. Upon receipt of the request, the application server 112 makes a determination as to whether it is capable of providing a response to the initial request or whether it needs to forward the response for fulfillment to a respective application that provides the web content associated with the request for the selective partial update of web content.

As will be described in more detail below, the application server 112 may provide such a response without further communication with the application associated with the web content. In such a situation, the application server 112 provides a response to the request for the selective partial update of web content. Upon determining to forward the request to the application associated with the requested selective partial update of web content, the application server 112 forwards the request to the associated application for processing. This communication path is not shown within FIG. 1 for ease of illustration purposes. However, it is understood that an application associated with the requested selective partial update of web content resides on or in association with the application server 112.

Upon receiving a response from the application associated with the web content or upon determining that the requested selective partial update of web content may be served without communication with the application associated with the web content, the application server 112 formulates a response and forwards that response to the reverse proxy server 108 as represented by the arrow 126. Similarly, upon receiving the response from the application server 112 or upon determining that the request for selective partial update of web content may be served locally, the reverse proxy server 108 forwards the response to the forward proxy server 104 as represented by the arrow 128.

As will be described in more detail below, the reverse proxy server 108 may perform additional operations, such as caching web content received in the response from the application server 112. A determination as to whether to cache the received web content may be based upon standards, such as hypertext transfer protocol (HTTP) standards or other standards.

As described above in association with the reverse proxy server 108, upon receiving the response from the reverse proxy server 108 or upon determining that the request for selective partial update of web content may be served locally, the forward proxy server 104 forwards the response to the consumer electronics device 102 as represented by the arrow 130. As with the reverse proxy server 108, the forward proxy server 104 may also perform additional operations, such as caching web content received in a response from the reverse proxy server 108. A determination as to whether to cache the received web content may be based upon standards, such as HTTP standards or other standards.

Upon receipt of the response at the consumer electronics device 102 from the forward proxy server 104, the consumer electronics device 102 performs a partial update of the web content in response to receipt of the update. As will be described in more detail below, such an update at the consumer electronics device 102 may be in the form of a display operation associated with the partial update of the web content and may also include storage operation associated with the partial update of the web content.

As such, each device represented within FIG. 1 performs operations associated with requested partial updates of web content in response to either a request originated by a user via an input device (not shown in FIG. 1) of the consumer electronics device 102 or in response to receipt of a request from another device. Many other variations of interconnection and device organization are possible and all are considered within the scope of the present subject matter.

It should be noted that the consumer electronics device 102 may be a portable computing device, either by a user's ability to move the consumer electronics device 102 to different locations or by the consumer electronics device 102's association with a portable platform, such as a plane, train, automobile, or other moving vehicle. It should also be noted that the consumer electronics device 102 may be any computing device capable of processing information as described above and in more detail below. For example, the consumer electronics device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

Figure 2:
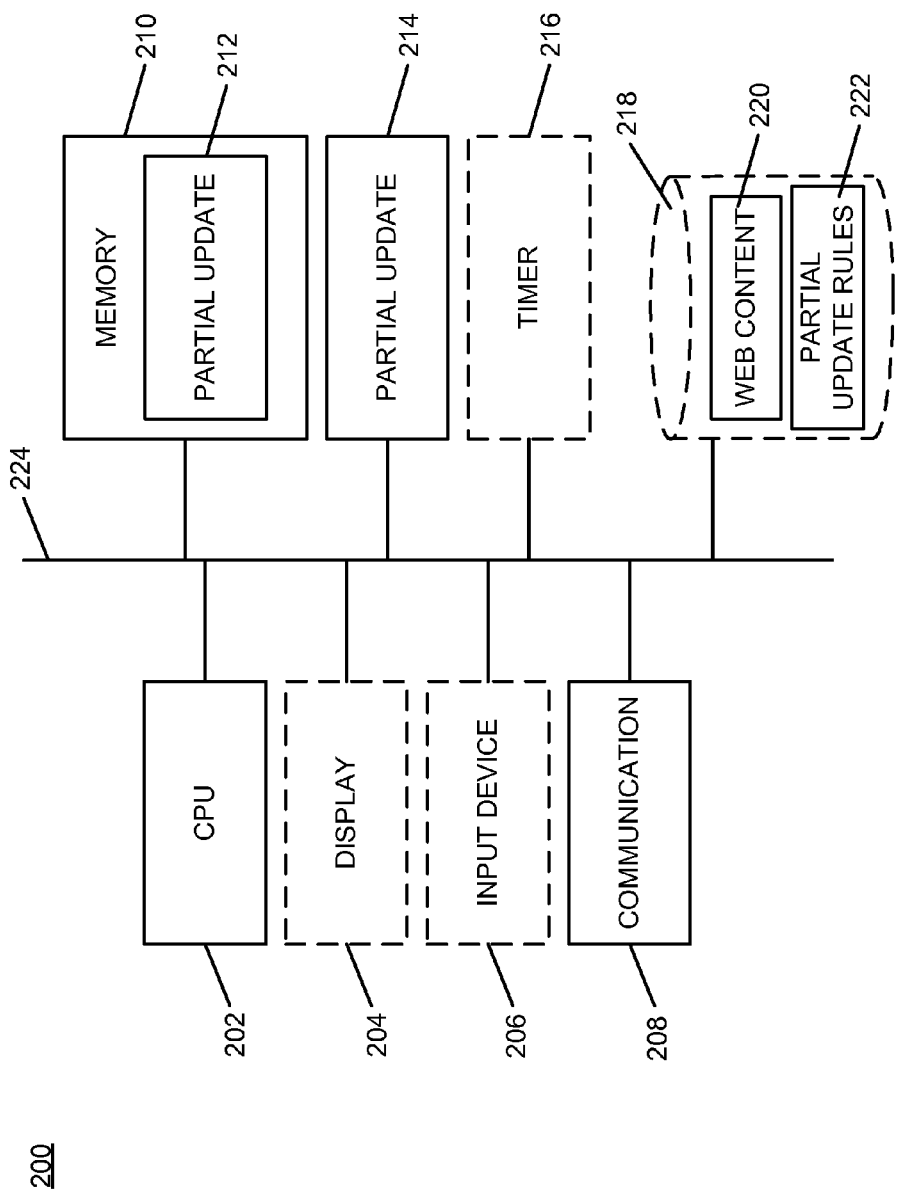
FIG. 2 is a block diagram of an example of an implementation of a core processing module that is capable of performing automated selective partial updates of web content based upon requested portions of the web content to be updated and a requested update period according to an embodiment of the present subject matter.

FIG. 2 is a block diagram of an example of an implementation of the core processing module 200 that is capable of performing automated selective partial updates of web content based upon requested portions of the web content to be updated and a requested update period. It is understood that the core processing module 200 or a similar module may be implemented for each of the consumer electronics device 102, forward proxy server 104, the reverse proxy server 108, and the application server 112. For brevity, the core processing module 200 will be described generally. However, the description of the core processing module 200 shall be considered applicable to each of the consumer electronics device 102, the forward proxy server 104, the reverse proxy server 108, and the application server 112, as appropriate. Differences may also exist for a given implementation of the consumer electronics device 102, the forward proxy server 104, the reverse proxy server 108, and the application server 112 and all are considered within the scope of the present subject matter.

A central processing unit (CPU) 202 provides computer instruction execution, computation, and other capabilities within the core processing module 200. A display 204 provides visual information to a user of a device, such as the consumer electronics device 102, and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for devices, such as the forward proxy server 104, the reverse proxy server 108, and the application server 112. Accordingly, the forward proxy server 104, the reverse proxy server 108, and the application server 112 may operate as a completely automated embedded device without user configurability or feedback. However, devices, such as the consumer electronics device 102 may provide user feedback and configurability via the display 204 and the input device 206, respectively.

A communication module 208 provides interconnection capabilities that allow the core processing module 200 to communicate with other modules within the system 100, such as communications between the consumer electronics device 102 and the forward proxy server 104, to request selective partial updates of web content. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 includes any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 also includes interrupt-level, stack-level, and application-level modules as appropriate. Furthermore, the communication module 208 includes any memory components used for storage, execution, and data processing for performing processing activities associated with the communication module 208. The communication module 208 may also form a portion of other circuitry described without departure from the scope of the present subject matter.

A memory 210 includes a partial update storage area 212 that stores pending requests for partial updates and that may also store partial updates of web content received at the core processing module 200. A partial update module 214 provides automated selective partial update processing for the core processing module 200. Though the partial update module 214 is illustrated as a component-level module for ease of illustration and description purposes, it should be noted that the partial update module 214 includes any hardware, programmed processor(s), and memory used to carry out the functions of the partial update module 214 as described above and in more detail below. For example, the partial update module 214 may include additional controller circuitry in the form of application specific integrated circuits (ASICs), processors, and/or discrete integrated circuits and components for performing electrical control activities associated with the partial update module 214. Additionally, the partial update module 214 also includes interrupt-level, stack-level, and application-level modules as appropriate. Furthermore, the partial update module 214 includes any memory components used for storage, execution, and data processing for performing processing activities associated with the partial update module 214. The partial update module 214 may also form a portion of other circuitry described without departure from the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A timer 216 allows the core processing module 200 to establish periodic intervals for selective partial updates of web content based upon the present subject matter. The timer 216 is illustrated with a dashed-line representation within FIG. 2 to indicate that it may be an optional component for devices, such as the forward proxy server 104, the reverse proxy server 108, and the application server 112. However, it is understood that the forward proxy server 104, the reverse proxy server 108, and the application server 112 may also be configured to establish periodic intervals for selective partial updates of web content without departure from the scope of the present subject matter.

A database 218 is associated with the core processing module 200 and provides storage capabilities for information associated with the automated selective partial updates of web content for the core processing module 200. The database 218 includes a web content storage area 220 and a partial update rules storage area 222 that may be stored in the form of tables or other arrangements accessible by the core processing module 200. The web content storage area 220 includes web content, such as entire web pages or partial updates to web content received and/or stored in response to requests for selective partial updates of web content. The web content storage area 220 may also be formed as cache memory or other storage structure without departure from the scope of the present subject matter. As will be described in more detail below, the partial update rules storage area 222 includes rules, such as rules to determine appropriate processing for received web content. For example, rules associated with parent processing for retrieval of partial updates for web content when the requested portion of web content is either not directly indexed within the web content storage area 220 or identified via a path to the web content may be provided. Additionally, when implemented on one of the forward proxy server 104, the reverse proxy server 108, and the application server 112, the rules may include caching rules, such as the HTTP caching rules described above. Many other possibilities exist for storage of information and processing rules and all are considered within the scope of the present subject matter.

The CPU 202, the display 204, the input device 206, the communication module 208, the memory 210, the partial update module 214, the timer 216, and the database 218 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the web content storage area 220 and the partial update rules storage area 222 are shown within the database 218, they may also be stored within the memory 210 without departure from the scope of the present subject matter. Accordingly, the core processing module 200 may take many forms and may be associated with many platforms.

The following example document object model (DOM) formatted as markup language (ML) pseudo code is presented in a hypertext markup language (HTML) pseudo code format for ease of illustration purposes. Additional example markup languages include extensible markup language (XML) and standard generalized markup language (SGML). Many other markup languages exist and all are considered within the scope of the present subject matter. The HTTP pseudo code of the example DOM shown below represents web content that may be processed to perform automated selective partial updates of web content based upon requested portions of the web content to be updated and a requested update period. The example DOM represented by the HTML pseudo code provides a framework within which examples that follow will be described.

---
Example 1: Document Object Model Pseudo Code
---
```
<html>
<head>
</head>
<body>
    <!-- Football Scores -->
    <table id="footballScores">
        <tr>
            <th>Game</th>
            <th>Score</th>
            <th>Quarter</th>
            <th>Time Remaining</th>
        </tr>
        <tr id="Pittsbugh_vs_NewEngland">
            <td>Pittsbugh vs NewEngland</td>
            <td id="Pittsbugh_vs_NewEngland_Score">27 - 3</td>
            <td id="Pittsbugh_vs_NewEngland_Quarter">4th</td>
            <td>2:00</td>
        </tr>
        <tr id="Buffalo_vs_Miami">
            <td>Buffalo vs Miami</td>
            <td id="Buffalo_vs_Miami_Score">12 - 7</td>
            <td id="Buffalo_vs_Miami_Quarter">2nd</td>
            <td>15:00</td>
        </tr>
    </table>
    <!-- Hockey Scores -->
```

---
Example 1: Document Object Model Pseudo Code
---
```
    <table>
        <tr>
            <th>Game</th>
            <th>Score</th>
            <th>Period</th>
            <th>Time Remaining</th>
        </tr>
        <tr>
            <td>Pittsbugh vs Detroit</td>
            <td>0-0</td>
            <td>1st</td>
            <td>5:05</td>
        </tr>
        <tr>
            <td>Buffalo vs Carolina</td>
            <td>2-4</td>
            <td>2nd</td>
            <td>0:53</td>
        </tr>
    </table>
</body>
</html>
```

As can be seen from the example DOM represented by the HTML pseudo code of Example 1, two HTML pseudo code comment sections delimited by pairs of comment tags (e.g., <!-- and -->) indicate that two tables are defined as football scores (e.g., <!-- Football Scores -->) and hockey scores (e.g., <!-- Hockey Scores -->). As will be described in more detail below, two example approaches to web content element processing for selective partial updates of web content are provided.

The first example utilizes identifiers associated with elements of the example DOM to access elements (e.g., fragments) of web content. The second example utilizes "paths" associated with elements of the example DOM to access fragments of web content. Accordingly, within the football scores table definition, an identifier is assigned to identify the football scores table (e.g., <table id="footballScores">). In contrast, the hockey scores table is defined without an identifier associated with it (e.g., <table> without an identifier). The football table will be used to describe identifier-based processing for selective partial updates of web content and the hockey table will be used to describe path-based processing for selective partial updates of web content.

As can also be seen from the example DOM, each table has rows delimited by a pair of table row tags (e.g., <tr> and </tr>). Each table also has a header row defining header elements delimited by a pair of table header tags (e.g., <th> and </th>). As such, each table defines a column header for each data element. For the football scores table, the column headers are game, score, quarter, and a time remaining. For the hockey scores table, the column headers are game, score, period, and a time remaining.

Within the football scores table, two games are represented and each has an identifier associated with its respective pair of table row tags (e.g., <tr id="Pittsburgh_vs_NewEngland"> and <tr id="Buffalo_vs_Miami">). Within the hockey table, two games are also represented. However, in contrast to the football scores table, the hockey scores table does not have identifiers associated with the respective elements.

Within the example DOM, both the football scores table and the hockey scores table have a game name as content associated with the first table data element in each row of the respective table delimited by the first table data pair of tags (e.g., <td> and </td>). As with the table row identifiers described above for the football scores table rows, two elements of each row have identifiers associated with them delimited by the respective pair of table data tags (e.g., <td id="Pittsburgh_vs_NewEngland_Score"> and </td>). The current content (e.g., score, quarter, etc.) associated with each table row is presented between the respective pair of table data tags. As such, identifier-based fragment processing for selective partial updates of web content will be described in association with the football scores table.

It is also noted that, as with the table rows described above for the hockey scores table, no identifiers are associated with the respective content elements. It is also noted that within the table rows of the hockey table, the first table data elements for each game is the name of the game. These data elements may be used for path identification within the hockey scores table. As such, path-based processing for selective partial updates of web content will be described in association with the hockey scores table.

While the examples of identifier-based and path-based processing that follow describe a user requesting or selecting, via a consumer electronics device, such as the consumer electronics device 102, an element for a partial update and other associated activities, it is understood that requests for partial updates may be made by selecting the respective element within a browser that displays the content associated with the example DOM or by any suitable selection processing. Additionally, a user may select, via the consumer electronics device 102, an element from a DOM model formatted in a markup language format without departure from the scope of the present subject matter. Many other possibilities exist for user selection of elements of web content upon which selective partial updates may be performed and all are considered within the scope of the present subject matter.

Regarding identifier-based processing for selective partial updates of web content, when elements of web content associated with a DOM have identifiers, the user may choose a granularity at which to request updates based upon the defined identifier granularity. For the football score section of the example DOM, the user may request to update the entire table of scores (e.g., id="footballScores"). Alternatively, the user pay request to update all information for a particular game (e.g., id="Pittsburgh_vs_NewEngland"). As another alternative, the user may request to update only the score of a particular game (e.g., id="Pittsburgh_vs_NewEngland_Score"). As such, the user may selectively identify elements of web content for a partial update. Processing to perform the requested partial update may use the defined identifier and these identified partial updates may be performed as described in association with the present subject matter.

Returning to the description of the example DOM shown above, it is noted that the example DOM does not include an identifier for certain content elements (e.g., time remaining fields). In this situation, if the user selects that element as the element requested to be updated, processing described herein as "parent processing" may be performed to retrieve the requested element. For example, parent processing may include walking up the DOM hierarchy tree until an identifier is found within the DOM model. This identifier may be used to retrieve the requested element (e.g., a child of the parent element) and the child element may be parsed from the retrieved web content to retrieve the requested element.

For example, in the case of the user requesting, via a consumer electronics device, such as the consumer electronics device 102, an update of the time remaining content element of the Pittsburg versus New England game, parent processing may be performed to walk up the DOM hierarchy until an identifier is found (e.g., id="Pittsburgh_vs_NewEngland"). The element associated with the found identifier may then be requested from the appropriate source, as described in more detail below in association with FIG. 3 through FIG. 7. In response to receipt of the requested update, processing may be performed to parse out the user-requested content element (e.g., <td>2:00</td>). The user-requested content may be replace either within a storage location, such as in the memory 210, in the partial update storage area 212 or the web content storage area 220. Alternatively, the user-requested content may be displayed within a web page displayed on a display, such as the display 204.

Regarding path-based processing for selective partial updates of web content, when elements of web content associated with a DOM do not have identifiers, the user may still choose a granularity at which to request updates. In such a situation, path-based processing is performed to retrieve the requested selective partial updates. As such, for the hockey scores table, it is noted that no identifiers are present. Path-based processing may be performed to dynamically walk the DOM hierarchy tree to figure out which node needs to update based upon the user's request for updated content. Path-based processing may operate similarly to parent processing by walking a DOM hierarchy with a result being a path to the requested element rather than a parent identifier associated with the element.

For example, if the user wants to update the entire hockey score section (e.g., all games, scores, periods, and time remaining), the user may select the element associated with the entire section of the example DOM as delimited by the pair of comment tags (e.g., <!-- Hockey Scores -->). Path-based processing may then be performed to determine a path associated with the request. An example path to the entire second of the example DOM for the hockey scores table may be identified as path="html:1/hbody:1/table:2" within the example DOM. The determined path may then be used as an identifier and processing similar to that described above for identifier-based processing may be performed.

As another example of path-based processing, if the user requested an update of the score of the Pittsburgh versus Detroit game, the user may select that content element. Path-based processing may again be performed to determine a path to the requested element. An example path to the score of the Pittsburgh versus Detroit game is path="html:1/hbody:1/table:2/tr:2/td:2" within the example DOM. The determined path may then be used as an identifier and processing similar to that described above for identifier-based processing may be performed.

As with the example DOM pseudo code above, the following example request for a selective partial update of web content is also formatted as markup language (ML) pseudo code and is presented in a hypertext markup language (HTML) pseudo code format for ease of illustration purposes. Again, many other markup languages exist and all are considered within the scope of the present subject matter. The description of the example DOM will continue below after a description of the following example request pseudo code.

The HTTP pseudo code of the example request shown below represents a request for a selective update of web content for a score of the Pittsburgh versus New England game.

Example 2: Request Pseudo Code

```
GET /resource/foo/bar HTTP/1.1
Elements-Requested: html/body/Pittsbugh_vs_NewEngland_Score;
Host: myserver.com
Connection: keep-alive
```

As can be seen from the example request pseudo code, the HTTP pseudo code for the example request is formatted as a "get" request. It is understood that a complimentary "put" message may be formed in response to receipt of the request by any responding device and that a person of skill in the art will be able to formulate such a response based upon the description contained herein.

Additionally, the example request pseudo code illustrates that web content elements may be individually requested using an identifier associated with the respective element. Identifiers may also be formulated from a path associated with the respective web content element, as described above. A request for a partial update of web content similar to the example request pseudo code above may be formulated and forwarded as otherwise described above and in more detail below to other devices or to applications associated with devices that provide or store web content. Request messages may be processed at the receiving devices or applications and responses may be formulated that include the requested identified web content elements. Alternatively, requests may be forwarded to other devices or applications that may be capable of providing the requested identified web content elements. Many other variations of messaging to support the present subject matter are possible and all are considered within the scope of the present subject matter. Accordingly, the automated selective partial updates of web content may utilize messaging similar to the example request pseudo code and similarly formatted responses to provide updates of identified web content elements associated with web content provided by a web content application.

FIG. 3 through FIG. 7 below describe example processes that may be executed by devices, such as the consumer electronics device 102, the forward proxy server 104, the reverse proxy server 108, and the application server 112, to perform automated selective partial updates of web content associated with the present subject matter. Many other variations on the example processes are possible and all are considered within the scope of the present subject matter. The example processes may be performed by modules, such as the partial update module 214, and/or executed by the CPU 202, in association with such devices. It should be noted that time out procedures and other error control procedures are not illustrated within the example processes described below for ease of illustration purposes. However, it is understood that all such procedures are considered to be within the scope of the present subject matter.

Additionally, as described above, a path to a requested web content element within a DOM may be resolved to create a form of identifier to the object. Accordingly, while the description below is based primarily upon identifier-based processing, it is understood that it applies at least equally to path-based processing as well.

Figure 3:
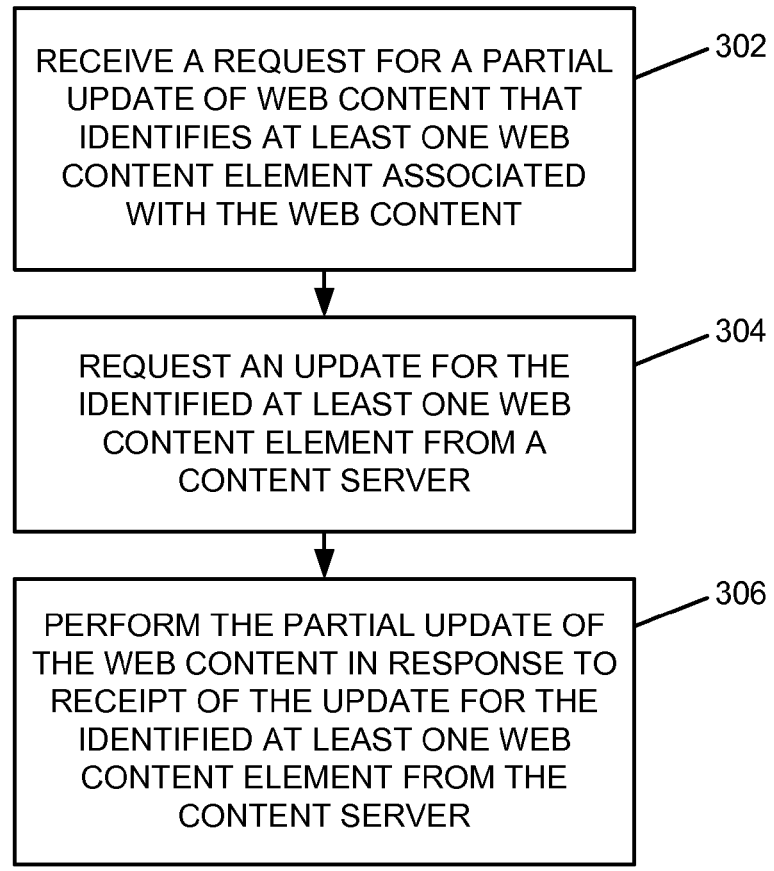
FIG. 3 is a flow chart of an example of an implementation of a process for performing automated selective partial updates of web content at devices, such as a consumer electronics device, a forward proxy server, a reverse proxy server, and an application server according to an embodiment of the present subject matter.

FIG. 3 is a flow chart of an example of an implementation of a process 300 for performing automated selective partial updates of web content at devices, such as the consumer electronics device 102, the forward proxy server 104, the reverse proxy server 108, and the application server 112. At block 302, the process 300 receives a request for a partial update of web content that identifies at least one web content element associated with the web content. At block 304, the process 300 requests an update for the identified at least one web content element from a content server. At block 306, the process 300 performs the partial update of the web content in response to receipt of the update for the identified at least one web content element from the content server.

Figure 4:
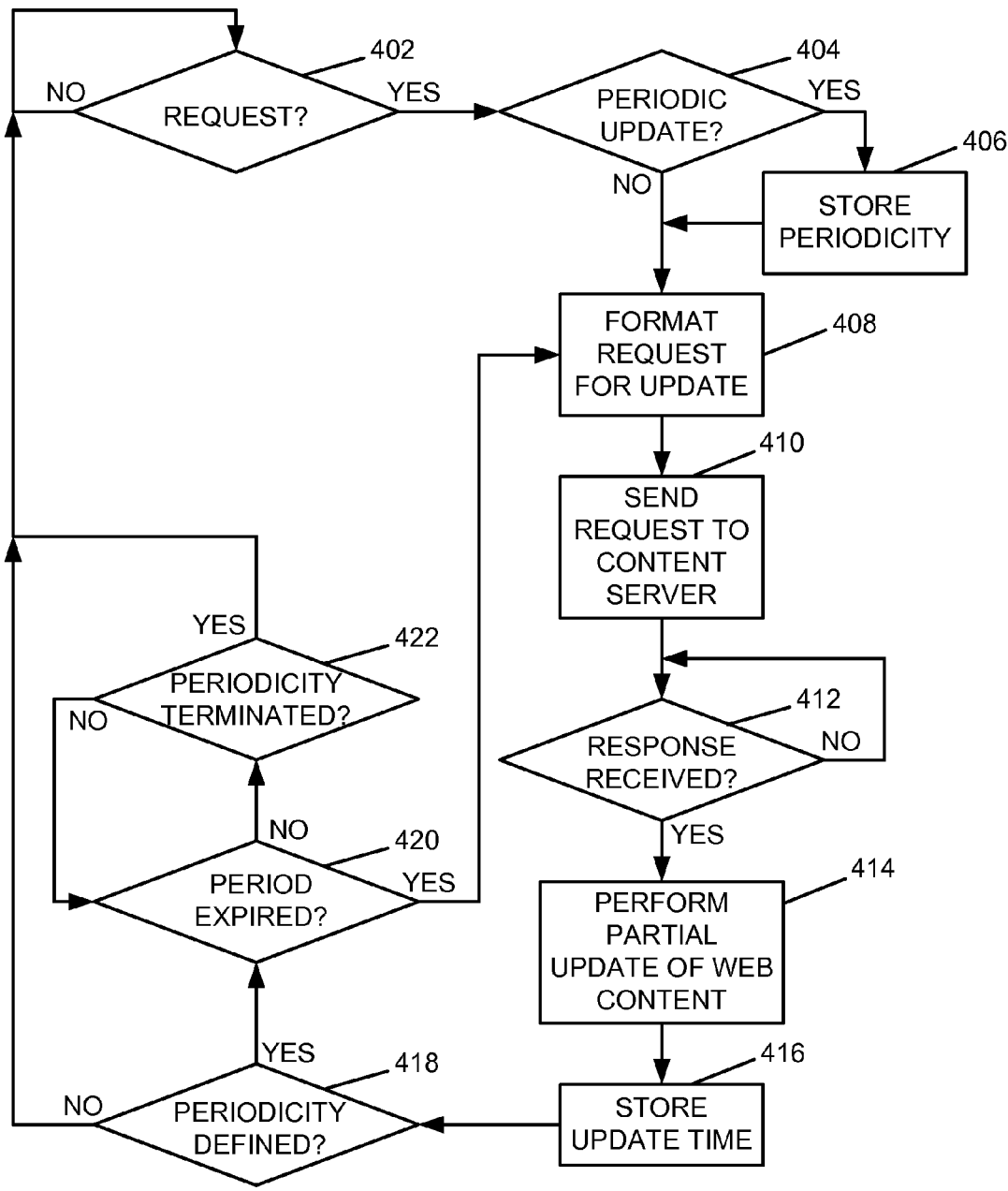
FIG. 4 is a flow chart of an example of an implementation of a process for performing automated selective partial updates of web content at a device, such as a consumer electronics device, according to an embodiment of the present subject matter.

FIG. 4 is a flow chart of an example of an implementation of a process 400 for performing automated selective partial updates of web content at a device, such as the consumer electronics device 102. The process 400 waits at decision point 402 for a request for a partial update of web content that identifies at least one web content element associated with the web content. The request may be received at the consumer electronics device 102, for example, from a user via the input device 208 associated with the consumer electronics device 102. When a determination is made that a request for a partial update of web content has been received, the process 400 makes a determination at decision point 404 as to whether the request includes a request to establish a periodic update for the identified web content element that identifies a user-specified period for the periodic update. When a determination is made that the request includes a request for a periodic update, the process 400 stores periodicity information, such as the identified user-specified period for the periodic update, at block 406. The periodicity information may be stored, for example, within the partial update storage area 212 of the memory 210.

Upon storage of the requested periodicity or when a determination is made at decision point 404 that a periodic update has not been requested, the process 400 formats a request for an update of the identified web content element at block 408. The formatted request may include a markup language (ML) formatted request identifying a portion of a document object model (DOM) associated with the identified web content element. The ML formatted request may further include a path identifier that references a path to the web content element within the DOM or may include a content identifier that identifies the web content element within the DOM, as described in more detail above. Many other possibilities exist for identifying the requested web content element and all are considered within the scope of the present subject matter.

At block 410, the process 400 sends the request to a content server. Within the present example, it is assumed that the content server is the forward proxy server 104 of FIG. 1. Alternatively, the consumer electronics device 102 may be in communication with other devices, such as the application server 112, and may send the formatted request to any such device. Furthermore, the content server may be an application residing on the consumer electronics device 102 without departure from the scope of the present subject matter.

The process 400 waits at decision point 412 for a response to the request for the update of the identified web content element to be received. Upon receipt of the response, the process 400 performs a partial update of the web content for the identified web content element at block 414. Performing the partial update of the web content may include, for example, storing the update for the identified web content element to a local memory, such as the memory 210, and may also include updating a display region associated with the identified web content element with the update for the identified web content element.

At block 416, the process 400 stores an update time associated with the performed partial update of the web content. At decision point 418, the process 400 makes a determination as to whether periodicity has been defined in association with the request. When a determination is made that periodicity has not been defined, the process 400 returns to decision point 402 to await another request for a partial update of web content.

When a determination is made that periodicity has been defined for the web content element, the process 400 makes a determination at decision point 420 as to whether a requested update period has expired. When a determination is made that the update period has not expired, the process 400 makes a determination at decision point 422 as to whether the periodicity has been terminated, such as by a user request to terminate the update periodicity or by closing of a web browser. When a determination is made that the periodicity has not been terminated, the process 400 returns to decision point 420 and iterates between determining whether the update period has expired and determining whether the periodicity has been terminated.

When a determination is made at decision point 420 that the update period has expired, the process 400 returns to block 408 to format a request for an update of the identified web content element. It should be noted that, alternatively, the process 400 may retrieve the previously formatted request from storage, such as from the memory 210, without departure from the scope of the present subject matter. The process 400 continues processing from block 408 as described above. Returning to the description of decision point 422, when a determination is made that the periodicity has been terminated, the process 400 returns to decision point 402 to await a request for a partial update of web content.

It should be noted that a web browser associated with a device, such as the consumer electronics device 102, may be configured based upon the present subject matter to initiate a process, such as the process 400, when the web browser is opened or directed to a particular web page. In such a situation, opening of the web browser or direction to a particular web page may initiate a request for an update of a previously-configured web content element and this request may be detected at decision point 402, as described above. Accordingly, the process 400 may be configured during one execution cycle of the web browser or access to a web page for a given web content element or for periodic updates and this configuration may persist such that the automated selective partial updates of web content is performed for previously-configured web content elements in an automated fashion.

Within FIG. 5 through FIG. 7 below, certain references are made to a cache. For purposes of the present description, a cache may include any local web content storage device. For example, the cache may include devices, such as the web content storage area 220 of the database 218 or the partial update storage area 212 of the memory 210. Many other suitable storage techniques are possible and all are considered within the scope of the present subject matter.

Figure 5:
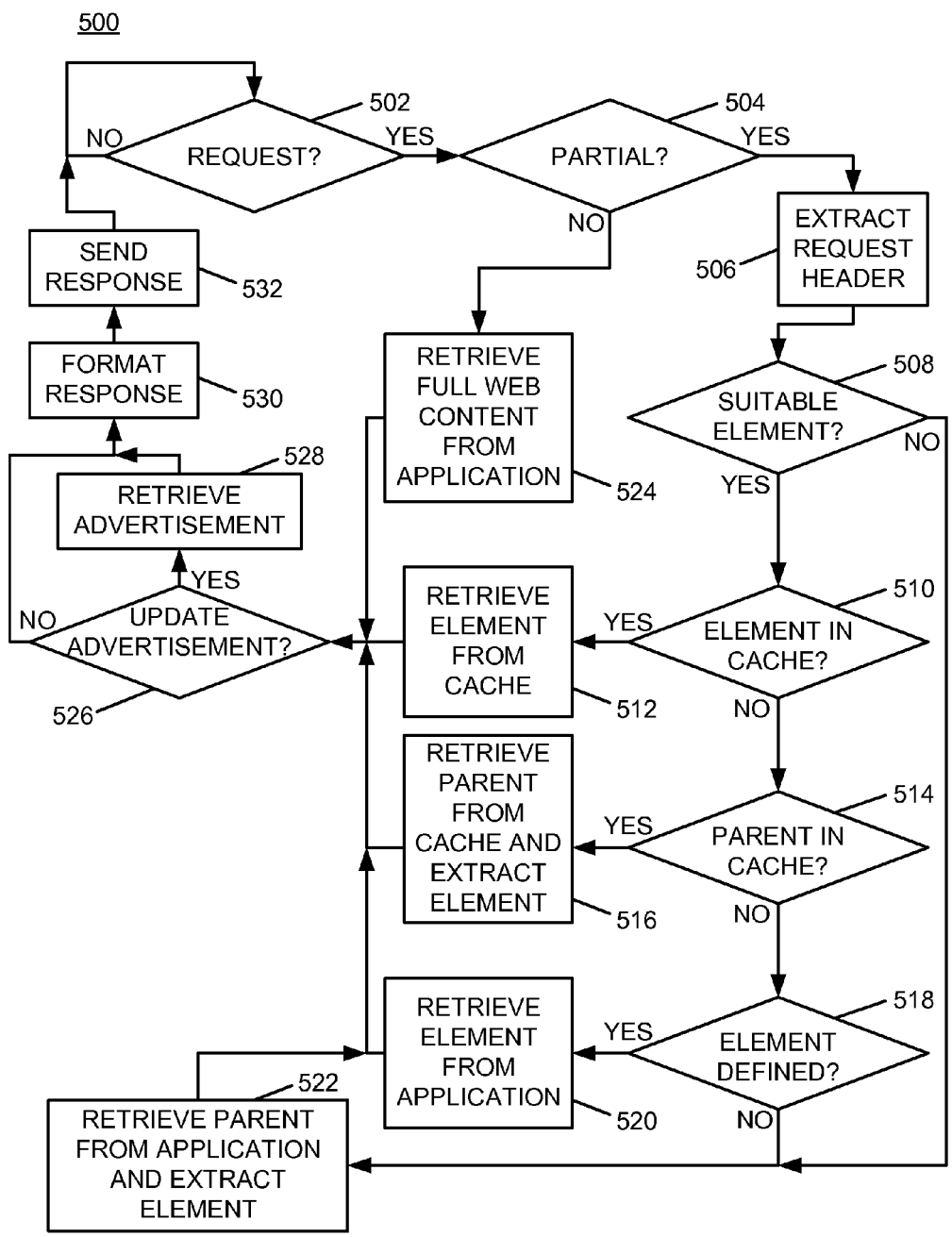
FIG. 5 is a flow chart of an example of an implementation of a process for performing a selective partial update of web content in response to receipt of a request from a device, such as a consumer electronics device or a reverse proxy server, according to an embodiment of the present subject matter.

FIG. 5 is a flow chart of an example of an implementation of a process 500 for performing a selective partial update of web content in response to receipt of a request from a device, such as the consumer electronics device 102 or the reverse proxy server 108. The process 500 may, for example, be suitable for use in association with an application server, such as the application server 112, and may also be suitable for use at other devices within a system, such as the system 100. The process 500 waits at decision point 502 to receive a request for an update of web content that identifies a web content element associated with web content. When a determination is made that a request for an update of web content has been received, the process 500 makes a determination at decision point 504 as to whether the request is a request for a partial update of the web content. When a determination is made at decision point 504 that the request includes a request for a partial update of web content, the process 500 extracts a request header from the request at block 506. The request header may include an identifier or path, as described above, that identifies the requested web content element.

At decision point 508, the process 500 makes a determination as to whether a web content element, or fragment, is a suitable element for the requesting device to request. For example, if the request identifies a stock ticker symbol, the process 500 may make a determination as to whether the stock ticker symbol is a suitable fragment to request and may also make a determination as to whether a current stock price or value may be a more appropriate fragment to provide in response to the request. A description of processing for a situation when the request is determined to not be a suitable request will be described further below.

When a determination is made that the requested element is a suitable element, the process 500 makes a determination at decision point 510 as to whether the requested element is in the cache. For example, the process 500 may search a stored DOM for the requested element. The process 500 may also determine whether a current version of the element is in the cache. When a determination is made that the requested element is in the cache, the process 500 retrieves the element from the cache at block 512. Processing performed after the process 500 retrieves the element from the cache at block 512 will be described below following a description of additional processing associated with the decision point 510.

When a determination is made at decision point 510 that the requested element is not in the cache, the process 500 makes a determination at decision point 514 as to whether a parent of the requested element is in the cache. As described above, the process 500 may search a stored DOM for a parent associated with the requested element within the cache. The process 500 may also determine whether a current version of the parent element is in the cache.

When a determination is made that the parent element is in the cache, the process 500 retrieves the parent from the cache and extracts the requested element at block 516. Processing performed after the process 500 retrieves the parent from the cache and extracts the element at block 516 will be described below following additional processing associated with decision point 514.

When a determination is made at decision point 514 that the parent is not in the cache, the process 500 makes a determination at decision point 518 as to whether the element is defined. For example, the process 500 may make a determination as to whether the element is defined at an application level associated with a web content application that provides the web content.

When a determination is made that the element is defined, the process 500 retrieves the element from the application at block 520. When a determination is made that the element is not defined at the application at decision point 518 or when a determination is made at decision point 508 that the request does not identify a suitable element, the process 500 retrieves the parent of the requested element from an application, such as a web content application associated with a device such as the application server 112, and extracts the requested element at block 522.

Returning to the description of decision point 504, when a determination is made that a partial update of web content has not been requested, the process 500 retrieves the full web content from the application at block 524. Upon completing processing at any of the block 512, the block 516, the block 520, the block 522, or the block 524, the process 500 makes a determination at decision point 526 as to whether to update an advertisement associated with the web content with which the request is associated. When a determination is made to update an advertisement associated with the web content, the process 500 retrieves the advertisement from storage, such as from the web content storage area 220 within the database 218, or from the application associated with the web content at block 528. When a determination is made at decision point 526 not to update an advertisement associated with the web content or upon retrieving the advertisement at block 528, the process 500 formats a response at block 530. The response may include the retrieved or extracted element or other web content and advertising. The process 500 sends the response to the device from which the request for the partial update of the web content was received at block 532 and returns to decision point 502 to await another request.

It should be noted, that based upon the description above, the process 500 may return an extracted element that is different from the requested element, such as when the requested element is extracted from a parent web content element and is returned or when a full web content element is returned. Additionally, the process 500 may return additional information, such as when a suitable element was not requested. For example, when a stock ticker symbol is requested, the process 500 may also return the stock value or may return the stock value instead of returning the stock ticker symbol. Many other variations of processing are possible and all are considered within the scope of the present subject matter.

Figure 6:
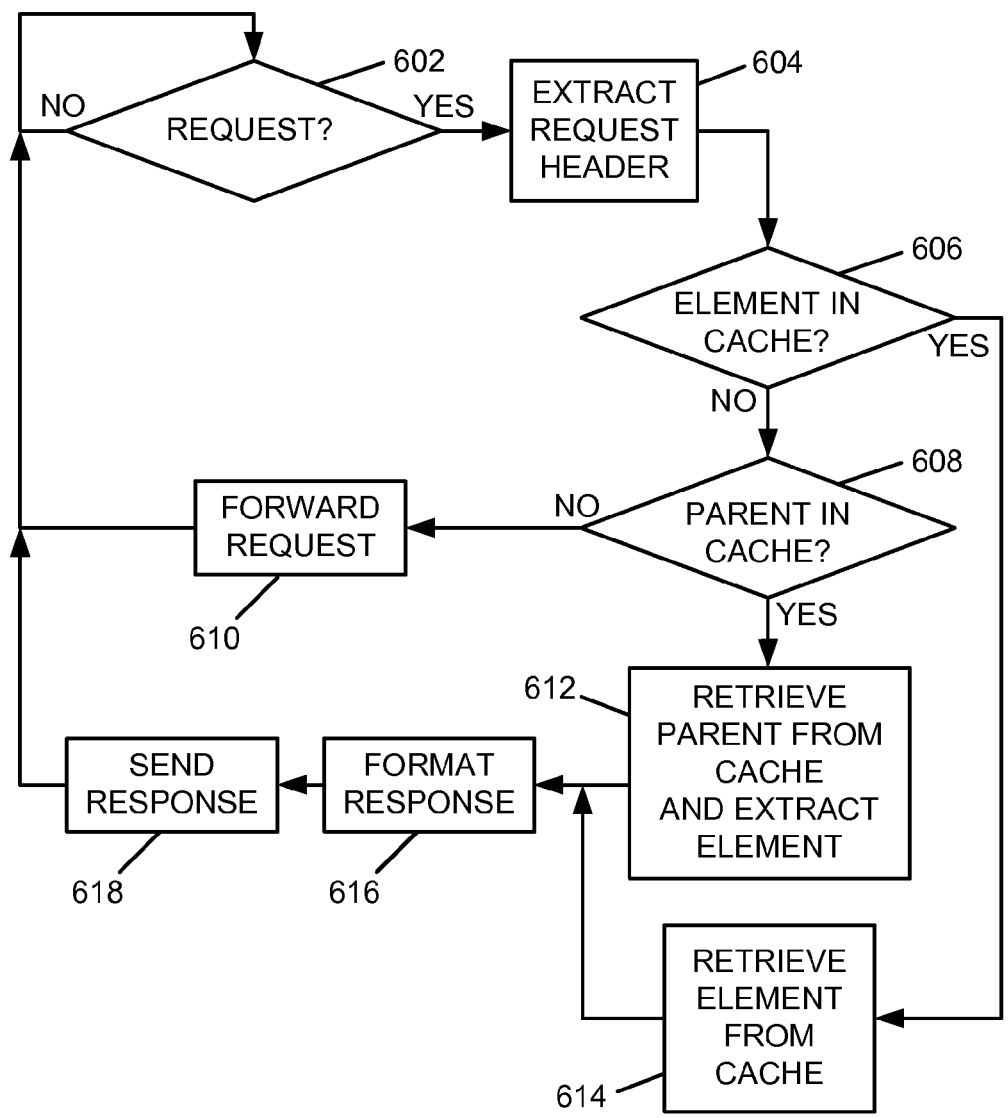
FIG. 6 is a flow chart of an example of an implementation of a process that may be performed for inbound request processing associated with a request for a partial update of web content at a device, such as a forward proxy server or a reverse proxy server, according to an embodiment of the present subject matter.

FIG. 6 is a flow chart of an example of an implementation of a process 600 that may be performed for inbound request processing associated with a request for a partial update of web content at a device such as the forward proxy server 104 or the reverse proxy server 108. As such, the process 600 may be considered an inbound proxy server process and may be executed at devices such as the forward proxy server 104 and the reverse proxy server 108. For ease of illustration purposes, the example within the process 600 illustrates processing associated with a partial request for an update to web content. Additional processing similar to that described above in association with FIG. 5 may be performed to determine whether the request was a partial request or a request for full web content without departure from the scope of the present subject matter.

The process 600 waits at decision point 602 for a request for a partial update of web content to be received. When a determination is made that a request for a partial update of web content has been received, the process 600 extracts a request header from the received request at block 604. The request header may include an identifier or path, as described above, that identifies the requested web content element.

At decision point 606, the process 600 makes a determination as to whether the element is located within a local web content storage device, such as a local cache as described above. For example, the process 600 may search a stored DOM for the requested element in the cache. Additionally, the process 600 may check for a current version of the requested element while searching the DOM for the requested element in the cache.

When a determination is made that the element is not in the cache, the process 600 makes a determination at decision point 608 as to whether a parent element of the requested element is in the cache. Similarly, the process 600 may search a stored DOM for a parent element of the requested element in the cache. Further, the process 600 may also check for a current version while searching the DOM for a parent element of the requested element in the cache.

When a determination is made at decision point 608 that the parent element of the requested element is not in the cache, the process 600 forwards the request to another content server at block 610 and returns to decision point 602 to await another request. Regarding the forward of the request at block 610, when the process 600 is executed on a device such as the forward proxy server 104, the process 600 may forward the request to either the reverse proxy server 108 or the application server 112. Likewise, when the process 600 is executed on a device such as the reverse proxy server 108, the process 600 may forward the request to the application server 112. Many other variations are possible regarding forwarding of the received request and all are considered within the scope of the present subject matter.

Returning to the description of decision point 608, when a determination is made that the parent element is in the cache, the process 600 retrieves the parent element from the cache and extracts the element at block 612. Similarly, returning to the description of decision point 606, when a determination is made that the element is in the cache, the process 600 may retrieve the element from the cache at block 614. Upon retrieval of the element from the cache at block 614 or upon retrieval of the parent element from the cache and extraction of the element at block 612, the process 600 formats a response to the request at block 616. At block 618, the process 600 sends the response to the device from which the request was received including the retrieved or extracted element and returns to decision point 602 to await another request.

Figure 7:
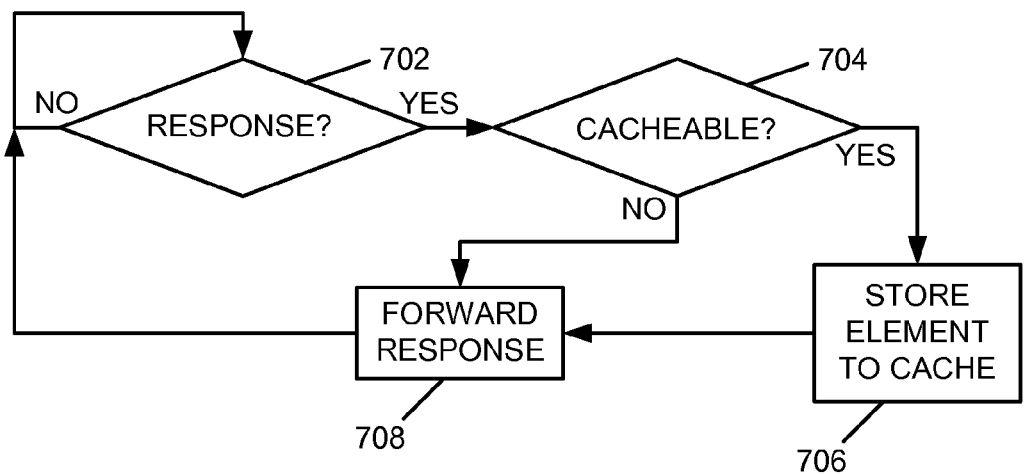
FIG. 7 is a flow chart of an example of an implementation of a process for processing a response to a request for a partial update of web content and for determining whether the content associated with the response is cacheable according to an embodiment of the present subject matter.

FIG. 7 is a flow chart of an example of an implementation of a process 700 for processing a response to a request for a partial update of web content and for determining whether the content associated with the response is cacheable. As such, the process 700 may be considered an outbound proxy server process and may be executed at devices such as the reverse proxy server 108 and the forward proxy server 104. The process 700 waits at decision point 702 for a response to a request for a partial update of web content to be received. It should be noted that the response to the request for a partial update of web content may be received in response to forwarding such a request as described in association with FIG. 6 above.

When a determination is made that a response to a request for a partial update of web content has been received, the process 700 makes a determination at decision point 704 as to whether the web content associated with the response is cacheable. For example, the process 700 may make such a determination based upon appropriate specifications, such as an HTTP specification, regarding storage of web content at servers such as the reverse proxy server 108 and the forward proxy server 104. Additionally, the HTTP specifications may be stored, for example, within the partial update rules storage area 222 within the database 218.

When a determination is made at decision point 704 that the web content associated with the response is cacheable, the process 700 stores the element to the cache at block 706. For example, the process 700 may store the element in the web content storage area 220 within the database 218 or in the partial update storage area 212 of the memory 210. Upon storing the element to the cache or upon making a determination that the element is not cacheable at decision point 704, the process 700 forwards the response to the device from which the initial request was received at block 708 and returns to decision point 702 to await a new response.

As described above in association with FIG. 1 through FIG. 7, the example systems and processes provide automated selective partial updates of web content. Many other variations and additional activities associated with automated selective partial updates of web content are possible and all are considered within the scope of the present subject matter.

Those skilled in the art will recognize, upon consideration of the above teachings, that certain of the above examples are based upon use of a programmed processor such as the CPU 202. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable storage medium(s) may be utilized. The computer-usable or computer-readable storage medium may be, for example but not limited to, an electronic, magnetic, optical, electromagnetic, infrared, or semiconductor system, apparatus, or device medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store the program for use by or in connection with the instruction execution system, apparatus, or device.

Computer program code for carrying out operations of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, performed by a content proxy server comprising:
    receiving a request, from a client device or from another content proxy server, for a partial update of web content on the client device, the request comprising an identifier that identifies at least one web content element associated with the web content;
    responsive to receiving the request, determining whether a current version of the at least one web content element identified by the identifier resides in a local web content storage device;
    in response to determining that a current version of the at least one web content element resides in the local web content storage device:
        retrieving the current version from the local web content storage device;
        formatting a response to the request containing the current version from the local web content storage device; and
        sending the response to the client device or to the another content proxy server from which the request was received;
    in response to determining that a current version of the at least one web content element does not reside in the local web content storage device, determining whether a parent element of the at least one web content element resides in the local web content storage device:
    responsive to determining that, the parent element does not reside in the local content storage device:
        forwarding the request to a further content proxy server or an application server for fulfillment;
        receiving a fulfillment response from the further content proxy server or the application server;
        forwarding the fulfillment response to the client device or to the another content proxy server from which the request was received;
    responsive to determining that the parent element does reside in the local web content storage device:
        extracting the at least one web content element from the parent element;
        formatting a response to the request containing the at least one web content element: and
        sending the response to the client device or to the another content proxy server from which the request was received.

2. The method of claim 1, where the identifier identifies a portion of a document object model (DOM) associated with the identified at least one web content element and comprises at least one of a path identifier that references a path to the at least one web content element within the DOM and a content identifier that identifies the at least one web content element within the DOM and where requesting the update for the identified at least one web content element from the content server comprises sending a markup language (ML) formatted request comprising the at least one of the path identifier and the content identifier to the content server.

3. The method of claim 1, wherein in response to determining that a current version of the at least one web content element does not reside in the local web content storage device, the method further comprises:
    receiving from the further content proxy server or device a response to the request;
    determining whether content associated with the response is cacheable;
    in response to determining that the content associated with the response is cacheable, storing the content in the local web content storage device.

4. The method of claim 3, wherein determining whether the content associated with the response is cacheable is based upon a markup language specification.

5. The method of claim 1, where determining whether a current version of the at least one web content element identified by the identifier resides in a local web content storage device comprises searching a stored document object model (DOM) associated with the web content for a current version of the identified at least one web content element, where the DOM is stored within the local web content storage device of the content proxy.

6. The method of claim 5, where searching the stored document object model (DOM) associated with the web content for the current version of the identified at least one web content element comprises searching the DOM to identify a parent web element relative to the identified at least one web content element within the DOM.

7. The method of claim 1 where requesting the update for the identified at least one web content element from the content server comprises requesting a periodic update for the identified at least one web content element identifying a user-specified period for the periodic update.

8. A system, comprising:
    a communication module; and
    a processor programmed to:
        receive a request, from a client device or from another content proxy server, for a partial update of web content on the client device, the request comprising an identifier that identifies at least one web content element associated with the web content;
        responsive to receiving the request, determine whether a current version of the at least one web content element identified by the identifier resides in a local web content storage device;
        in response to determining that a current version of the at least one web content element resides in the local web content storage device:
            retrieve the current version from the local web content storage device;
            format a response to the request containing the current version from the local web content storage device; and
            send the response to the client device or to the another content proxy server from which the request was received;
        in response to determining that a current version of the at least one web content element does not reside in the local web content storage device, determining whether a parent element of the at least one web content element resides in the local web content storage device;
responsive to determining that the parent element does not reside in the local content storage device:
forward the request to a further content proxy server or an application server for fulfillment;
receive a fulfillment response from the further content proxy server or the application server;
forward the fulfillment response to the client device or to the another content proxy server from which the request was received;
responsive to determining that the parent element does reside in the local web content Storage device:
extracting the at least one web content element from the parent element;
formatting a response to the request containing the at least one web content element; and
sending the response to the client device or to the another content proxy server from which the request was received.

9. The system of claim 8, where the identifier identifies a portion of a document object model (DOM) associated with the identified at least one web content element and comprises at least one of a path identifier that references a path to the at least one web content element within the DOM and a content identifier that identifies the at least one web content element within the DOM and where, in being programmed to request the update for the identified at least one web content element from the content server, the processor is programmed to send a markup language (ML) formatted request comprising the at least one of the path identifier and the content identifier to the content server.

10. The system of claim 8, further comprising:
the local web content storage device comprising a cache memory;
a display; and
wherein the processor is further programmed to perform operations comprising at least one of:
in response to receiving a response from the further proxy content server, store an update to the at least one web content element to the cache memory;
send the update for the identified at least one web content element to a device from which the request for the partial update of the web content was received; and
update a display region of the display associated with the identified at least one web content element with the update for the identified at least one web content element.

11. The system of claim 10, where the processor is further programmed to determine whether the update for the identified at least one web content element is cacheable based upon a markup language specification, and where in being programmed to store the update for the identified at least one web content element to the cache memory associated with the web content, the processor is programmed to determine that the update for the identified at least one web content element is cacheable.

12. The system of claim 8, where determining that a current version of the at least one web content element resides in the local web content storage device comprises searching a stored document object model (DOM) associated with the web content for the current version of the identified at least one web content element, where the DOM is stored within the local web content storage device.

13. The system of claim 12, where, searching the stored document object model (DOM) associated with the web content for the current version of the identified at least one web content element, comprises searching the DOM to identify a parent web element relative to the identified at least one web content element within the DOM.

14. The system of claim 8, where, in being programmed to request the update for the identified at least one web content element from the content server, the processor is programmed to request a periodic update for the identified at least one web content element identifying a user-specified period for the periodic update.

15. A computer program product, comprising:
a computer useable storage medium having computer readable program code embodied therewith, where the computer readable program code when executed on a computer at a content proxy server device causes the computer to:
receive a request, from a client device or from another content proxy server, for a partial update of web content on the client device, the request comprising an identifier that identifies at least one web content element associated with the web content;
responsive to receiving the request, determining whether a current version of the at least one web content element identified by the identifier resides in a local web content storage device;
in response to determining that a current version of the at least one web content element resides in the local web content storage device:
retrieving the current version from the local web content storage device;
formatting a response to the request containing the current version from the local web content storage device; and
sending the response to the client device or to the another content proxy server from which the request was received;
in response to determining that a current version of the at least one web content element does not reside in the local web content storage device, determining whether a parent element of the at least one web content element resides in the local web content storage device;
responsive to determining that the parent element does not reside in the local content Storage device:
forwarding the request to a further content proxy server or an application server for fulfillment;
receiving a fulfillment response from the further content proxy server or the application server;
determining whether content associated with the fulfillment response is cacheable; and
in response to determining that the content associated with the response is cacheable, storing the content in the local web content storage device; and
forwarding the fulfillment response to the client device or to the another content proxy server from which the request was received;
responsive to determining that the parent element does reside in the local web content storage device:
extracting the at least one web content element from the parent element;
formatting a response to the request containing the at least one web content element; and sending the response to the client device or to the another content proxy server from which the request was received.

16. The computer program product of claim 15, where the identifier identifies a portion of a document object model (DOM) associated with the identified at least one web content element and comprises at least one of a path identifier that references a path to the at least one web content element within the DOM and a content identifier that identifies the at least one web content element within the DOM and where:

determining whether a current version of the at least one web content element identified by the identifier resides in a local web content storage device comprises the computer readable program when executed on the computer causes the computer to send a markup language (ML) formatted request comprising the at least one of the path identifier and the content identifier to the content server.

17. The computer program product of claim 15, where the computer readable program when executed on the computer causes the computer to at least one of:

in response to receiving the fulfillment response from the further proxy content server, store an update for the identified at least one web content element to a cache memory associated with the web content.

18. The computer program product of claim 17, where the computer readable program when executed on the computer further causes the computer to determine whether the update for the identified at least one web content element is cacheable based upon a markup language specification, and where in causing the computer to store the update for the identified at least one web content element to the cache memory associated with the web content, the computer readable program when executed on the computer causes the computer to determine that the update for the identified at least one web content element is cacheable.

19. The computer program product of claim 15, where determining that a current version of the at least one web content element resides in the local web content storage device comprises searching a stored document object model (DOM) associated with the web content for a current version of the identified at least one web content element, where the DOM is stored within the local web content storage device.

20. The computer program product of claim 19, where, in causing the computer to search the stored document object model (DOM) associated with the web content for the current version of the identified at least one web content element, the computer readable program when executed on the computer causes the computer to search the DOM to identify a parent web element relative to the identified at least one web content element within the DOM.

21. The computer program product of claim 15, where, in causing the computer to request the update for the identified at least one web content element from the content server, the computer readable program when executed on the computer causes the computer to request a periodic update for the identified at least one web content element identifying a user-specified period for the periodic update.

\* \* \* \* \*

UNITED STATES PATENT AND TRADEMARK OFFICE
CERTIFICATE OF CORRECTION

PATENT NO.         : 9,882,954 B2                                          Page 1 of 1
APPLICATION NO.    : 13/546498
DATED              : January 30, 2018
INVENTOR(S)        : Burckart et al.

It is certified that error appears in the above-identified patent and that said Letters Patent is hereby corrected as shown below:

In the Claims

In Column 21, Line 47, in Claim 1, delete "that," and insert --that-- therefor

In Column 21, Line 61, in Claim 1, delete "element:" and insert --element;-- therefor In Column 23, Line 15, in Claim 8, delete "Storage" and insert --storage-- therefor In Column 23, Line 62, in Claim 12, delete "clement" and insert --element-- therefor In Column 24, Line 48, in Claim 15, delete "Storage" and insert --storage-- therefor In Column 25, Line 10, in Claim 16, delete "clement" and insert --element-- therefor Signed and Sealed this
Thirtieth Day of July, 2019

Andrei Iancu
*Director of the United States Patent and Trademark Office*